US009653035B2

(12) United States Patent
Lin et al.

(10) Patent No.: US 9,653,035 B2
(45) Date of Patent: May 16, 2017

(54) VOLTAGE CALIBRATION CIRCUIT AND RELATED LIQUID CRYSTAL DISPLAY DEVICE

(71) Applicant: Sitronix Technology Corp., Hsinchu County (TW)

(72) Inventors: Tsun-Sen Lin, Hsinchu County (TW); Min-Nan Liao, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 14/259,167

(22) Filed: Apr. 23, 2014

(65) Prior Publication Data

US 2015/0054810 A1 Feb. 26, 2015

Related U.S. Application Data

(60) Provisional application No. 61/869,070, filed on Aug. 23, 2013.

(30) Foreign Application Priority Data

Feb. 21, 2014 (TW) ............................ 103105928 A

(51) Int. Cl.
*G06F 3/038* (2013.01)
*G09G 3/36* (2006.01)

(52) U.S. Cl.
CPC ......... *G09G 3/3696* (2013.01); *G09G 3/3655* (2013.01); *G09G 2310/06* (2013.01); *G09G 2320/02* (2013.01)

(58) Field of Classification Search
CPC ............. G09G 3/3655; G09G 2310/06; G09G 2320/02; G09G 3/3696
USPC ........................................... 345/87–100, 211
See application file for complete search history.

(56) References Cited

U.S. PATENT DOCUMENTS

| | | | | |
|---|---|---|---|---|
| 7,893,907 | B2 * | 2/2011 | Kang | 345/94 |
| 8,159,435 | B2 | 4/2012 | Hirayama | |
| 2006/0145995 | A1 * | 7/2006 | Kim et al. | 345/98 |
| 2007/0115274 | A1 | 5/2007 | Shih | |
| 2007/0146260 | A1 | 6/2007 | Kang | |
| 2009/0027314 | A1 * | 1/2009 | Kohno | G09G 3/3233 345/76 |
| 2010/0188347 | A1 * | 7/2010 | Mizuhashi | G02F 1/13338 345/173 |
| 2011/0221983 | A1 | 9/2011 | Lee | |

(Continued)

FOREIGN PATENT DOCUMENTS

| | | | |
|---|---|---|---|
| CN | 102243851 | A | 11/2011 |
| CN | 103065594 | A | 4/2013 |

(Continued)

*Primary Examiner* — Jonathan Blancha
(74) *Attorney, Agent, or Firm* — Winston Hsu; Scott Margo

(57) ABSTRACT

The present disclosure provides a voltage calibration circuit. The voltage calibration circuit includes a coupling voltage detection circuit and a common voltage circuit. The coupling voltage detection circuit is used for detecting a coupling voltage in an initial phase and generating a compensation voltage according to the coupling voltage. The common voltage circuit is used for adjusting a common voltage according to the compensation voltage and outputting the common voltage to a display module in a display phase.

15 Claims, 13 Drawing Sheets

(56) References Cited

U.S. PATENT DOCUMENTS

| | | | | |
|---|---|---|---|---|
| 2013/0009928 | A1 * | 1/2013 | Shirai | G09G 3/3655 345/209 |
| 2014/0168043 | A1 * | 6/2014 | Zhang et al. | 345/90 |

FOREIGN PATENT DOCUMENTS

| | | | |
|---|---|---|---|
| JP | H02217894 | A | 8/1990 |
| JP | H06186530 | A | 7/1994 |
| JP | H085989 | A | 1/1996 |
| JP | 2001147420 | A | 5/2001 |
| JP | 2008304660 | A | 12/2008 |
| JP | 2009265355 | A | 11/2009 |
| JP | 201383804 | A | 5/2013 |
| KR | 1020050054215 | A | 6/2005 |
| KR | 1020050092731 | A | 9/2005 |
| KR | 1020070054086 | A | 5/2007 |
| KR | 1020120109805 | A | 10/2012 |
| KR | 1020130005657 | A | 1/2013 |
| TW | I327304 | | 7/2010 |
| TW | 201035952 | | 10/2010 |
| TW | I362641 | | 4/2012 |

* cited by examiner

VOLTAGE CALIBRATION CIRCUIT AND RELATED LIQUID CRYSTAL DISPLAY DEVICE

CROSS REFERENCE TO RELATED APPLICATIONS

This application claims the benefit of U.S. Provisional Application No. 61/869,070, filed on Aug. 23, 2013, the contents of which are incorporated herein in their entirety.

BACKGROUND OF THE INVENTION

1. Field of the Invention

The present invention relates to a voltage calibration circuit and related liquid crystal device and related liquid crystal device cable of actively detecting a coupling voltage.

2. Description of the Prior Art

The advantages of a liquid crystal display (LCD) include lighter weight, less electrical consumption, and less radiation contamination. Thus, the LCD monitors have been widely applied to various portable information products, such as notebooks, PDAs, etc. The LCD monitor alters the alignment of liquid crystal molecules to control the corresponding light transmittance by changing the voltage difference between liquid crystals and provides images and produces images with light provided by the backlight module.

A thin film transistor (TFT) LCD monitor has become the most popular display device, so far. The function and the structure of the display module and the driving chip are all well-developed. Please refer to FIG. 1A, which illustrates a schematic diagram of a prior art TFT LCD monitor 10. The LCD monitor 10 includes a display module 120, a source driver 160, and a gate driver 180.

The display module 120 includes a plurality of parallel data lines $D_1$-$D_m$, a plurality of parallel gate lines $G_1$-$G_n$, and a plurality of display units $P_{11}$-$P_{mn}$. The data lines $D_1$-$D_m$ intersect the gate lines $G_1$-$G_n$, and each of the display units $P_{11}$-$P_{mn}$ is disposed at the intersection of a corresponding data line and a corresponding gate line. The source driver 160 and the gate driver 180 generate corresponding gate signals and driving signals, respectively. Each display unit of the display module 120 includes a TFT switch 100 and an equivalent capacitor 140. Each equivalent capacitor has an end coupled to a corresponding data line via a corresponding TFT switch, and another end coupled to a common voltage $V_{com}$ (Cs on common). When the TFT switch of a display unit is turned on by a gate signal generated by the gate driver 180, the equivalent capacitor of the display unit is electrically connected to its corresponding data line and can thus receive a driving voltage from the source driver 160. Therefore, the display unit can display images of various gray scales by changing the rotation of liquid crystal molecules based on charges stored in the equivalent capacitor 140.

There exists parasitic capacitance 111 within each display unit. At the moment that the gate lines $G_1$-$G_n$ are turned on or off, a voltage variance has an impact over the display units $P_{11}$-$P_{mn}$. When the gate lines $G_1$-$G_n$ are on, the display units $P_{11}$-$P_{mn}$ are charge to the accurate voltages. When the gate lines $G_1$-$G_n$ are off, a negative coupling voltage is generated on the display units $P_{11}$-$P_{mn}$. Since the source driving circuit 160 stops charging, the positive voltage and the negative voltage of the display units $P_{11}$-$P_{mn}$ are symmetric to the common voltage $V_{com}$, which is fixed. Therefore, the negative and positive liquid crystal molecules of the display data have the same gray level because they have same rotation volume. However, since the parasitic capacitances are different due to the variations of the LCD panel manufacturing process, this causes the negative coupling voltage on the display units $P_{11}$-$P_{mn}$ are no long symmetric to the common voltage $V_{com}$. Further, the inconsistency of the gray levels leads to the flickering.

Please refer to FIG. 1B, which is a waveform of an exemplary display unit in FIG. 1A. In FIG. 1B, when the gate line (e.g. $G_1$) goes from a negative level VGL (e.g. −12V) up to a positive level VGH (e.g. 15V), it represents that the gate line is on, where GND denotes a ground terminal. The source driving circuit 160 charges the equivalent capacitor 140 to a display voltage. When the gate line is off, the gate line drops from the positive level VGH (e.g. 15V) to the negative level VGL (e.g. −12V). At this moment, the equivalent capacitor 140 has a voltage drop (usually around 1V) due to the parasitic capacitance 111. After capacitive coupling, the voltages of the data lines $D_1$-$D_m$ are symmetric to the common voltage $V_{com}$. If the difference of the parasitic capacitance is large for each LCD, the display units $P_{11}$-$P_{mn}$ may not be symmetric to the common voltage $V_{com}$ after the capacitive coupling.

In order to solve the flickering, a NVM is exploited in the prior art, which adjusts the common voltage $V_{com}$ according to the flick. However, an extra writing process has to be added in the manufacturing.

SUMMARY OF THE INVENTION

It is therefore an objective of the present disclosure to provide a voltage calibration circuit.

The present disclosure provides a voltage calibration circuit. The voltage calibration circuit includes a coupling voltage detection circuit and a common voltage circuit. The coupling voltage detection circuit is used for detecting a coupling voltage in an initial phase and generating a compensation voltage according to the coupling voltage. The common voltage circuit is used for adjusting a common voltage according to the compensation voltage in a display phase and outputting the common voltage to a display module.

The present disclosure further provides a liquid crystal device (LCD). The LCD includes a display module, a gate driving circuit, a source driving circuit and a voltage calibration circuit. The display module includes a plurality of parasitic capacitances. The gate driving circuit is used for generating a plurality of gate signals. The source driving circuit is coupled to the display module and used for outputting a display voltage to the display module. The voltage calibration circuit includes a coupling voltage detection circuit and a common voltage circuit. The coupling voltage detection circuit is used for detecting a coupling voltage in an initial phase and generating a compensation voltage according to the coupling voltage. The common voltage circuit is used for adjusting a common voltage according to the compensation voltage in a display phase and outputting the common voltage to a display module.

The present disclosure further provides a voltage calibration circuit. The voltage calibration circuit includes a coupling voltage detection circuit and a source driving voltage circuit. The coupling voltage detection circuit is used for detecting a coupling voltage in an initial phase and generating a compensation voltage according to the coupling voltage. The source driving voltage circuit is used for adjusting a common voltage according to the compensation voltage in a display phase and outputting the common voltage to a display module.

The present disclosure further provides an LCD. The LCD includes a display module, a gate driving circuit and a voltage calibration circuit. The display module includes a plurality of parasitic capacitances. The gate driving circuit is used for generating a plurality of gate signals. The coupling voltage detection circuit is used for detecting a coupling voltage in an initial phase and generating a compensation voltage according to the coupling voltage. The source driving voltage circuit is used for adjusting a common voltage according to the compensation voltage in a display phase and outputting the common voltage to a display module.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
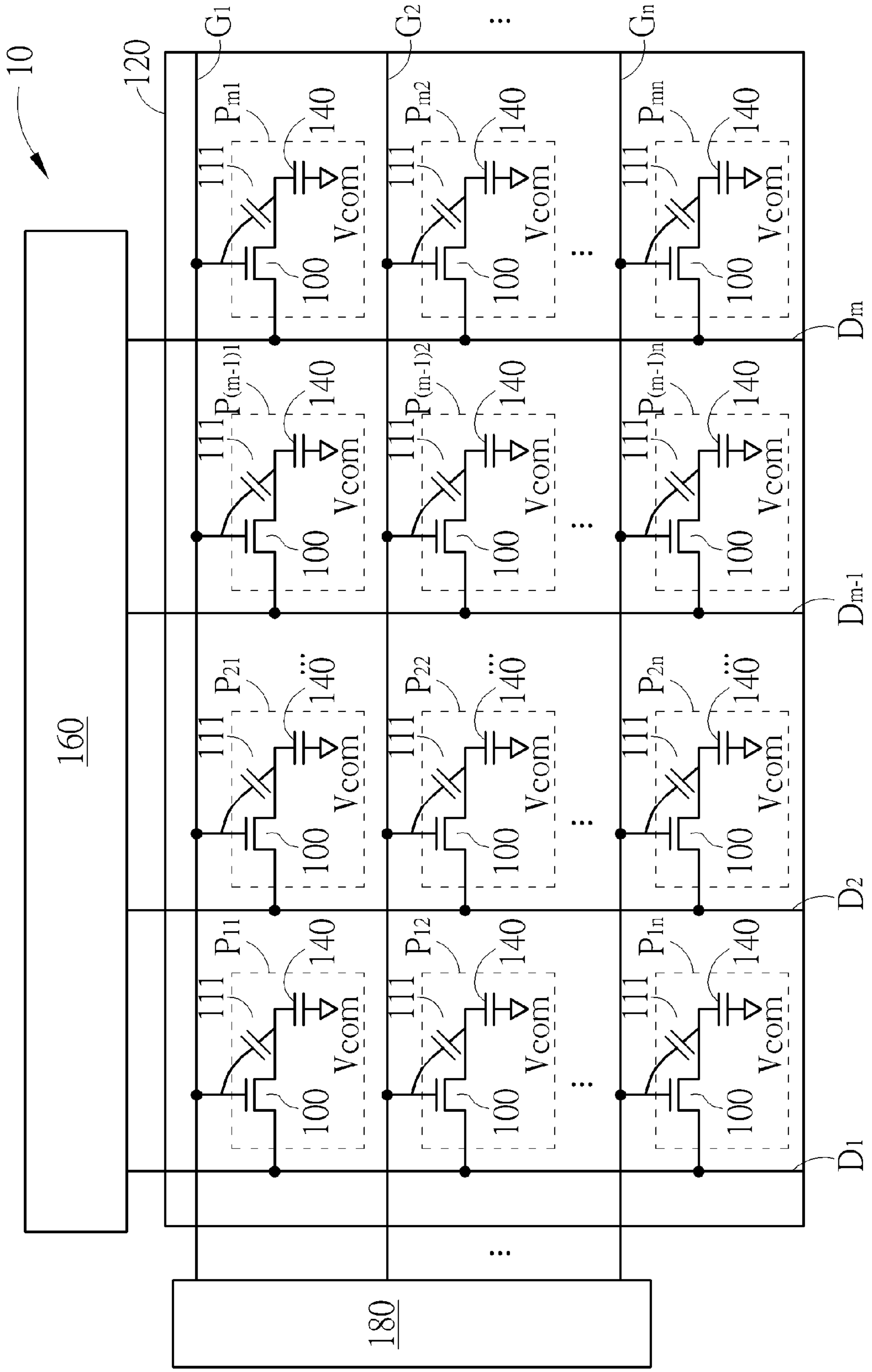
FIG. 1A PRIOR ART
FIG. 1A illustrates a schematic diagram of a prior art TFT LCD monitor 10.
Figure 1B:
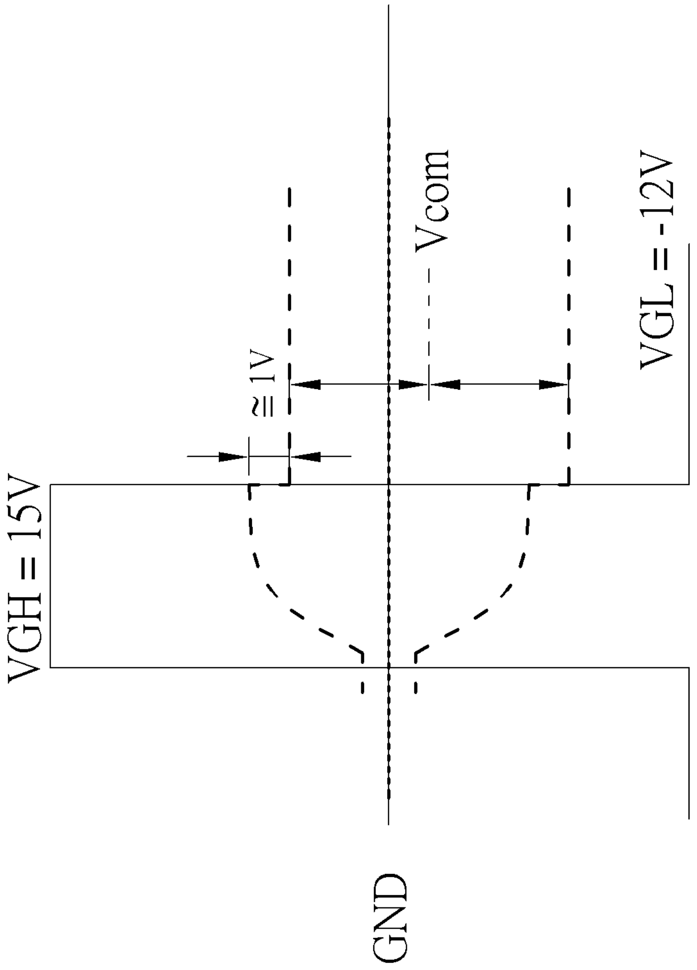
FIG. 1B PRIOR ART
FIG. 1B is a waveform of the display units in FIG. 1A.
Figure 2A:
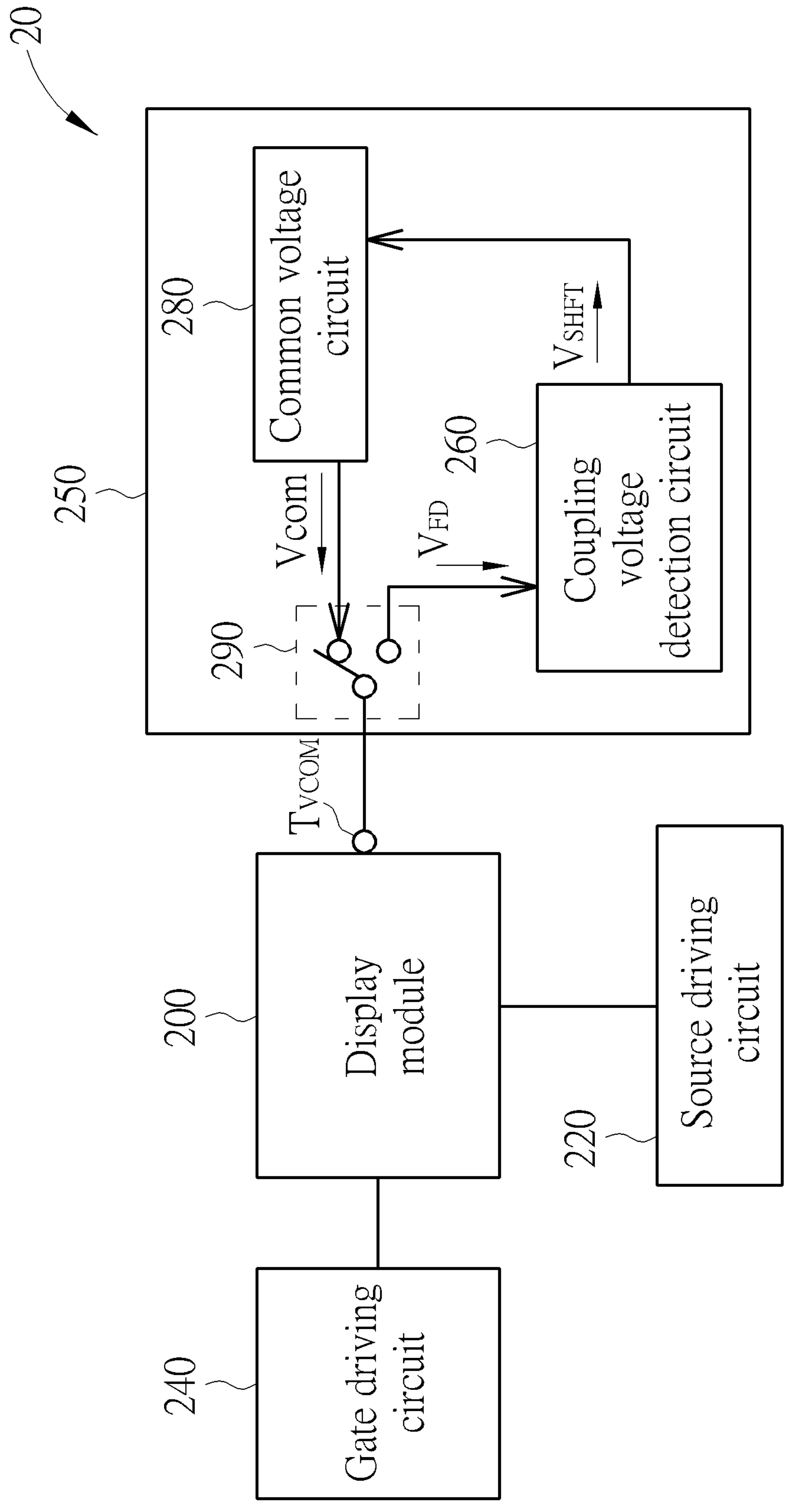
FIG. 2A is an exemplary schematic diagram of a Liquid Crystal Device (LCD).

Please refer to FIG. 2A, which is an exemplary schematic diagram of a Liquid Crystal Device (LCD) 20. The LCD 20 includes a display module 200, a source driving circuit 220, a gate driving circuit 240 and a voltage calibration circuit 250. The voltage calibration circuit 250 includes a coupling voltage detection circuit 260, a common voltage circuit 280 and a switch 290. The structure of the LCD 20 is similar to the TFT LCD 10 in FIG. 1, and the same operation is omitted herein. The gate driving circuit 240 is used for generating multiple gate signals to turn on/off multiple gate lines in order. The source driving circuit 220 is used to input multiple display voltages to the equivalent capacitors of the display module 200 when the gate lines are turned on (i.e. gate signals go from a negative voltage to a positive voltage). The parasitic capacitance of the display module 200 generate a coupling voltage $V_{FD}$ on the falling edge of the gate signals, dragging a common voltage $V_{com}$ on a common voltage terminal $T_{VCOM}$ down. The coupling voltage detection circuit 260 is coupled to the display module 200 through the switch 290, and used for detecting the coupling voltage $V_{FD}$ and generating a compensation voltage $V_{SHFT}$ according to the coupling voltage $V_{FD}$ in an initial phase. The initial phase of the LCD 20 is a time period after the LCD 20 is turned on but before the images are displayed. The common voltage circuit 280 is coupled to the common voltage terminal $T_{VCOM}$ of the display module 200 through the switch 290, and used for adjusting the common voltage $V_{com}$ according to the compensation voltage $V_{SHFT}$ in a display phase and outputting the common voltage $V_{com}$ to the display module 200. A display phase of the LCD 20 is a time period during which the LCD 20 can display images. The switch 290 is coupled to the display module 200, the coupling voltage detection circuit 260 and the common voltage circuit 280 and used for coupling the display module 200 to the common voltage circuit 280 or the coupling voltage detection circuit 260. Therefore, the LCD 20, in the initial phase, can detect the coupling voltage $V_{FD}$ generated by the parasitic capacitance and actively adjust the common voltage $V_{com}$ to avoid the flickering without any writing process performed. Further, the manufacture time can be reduced and the total throughout can be increased.

Figure 2B:
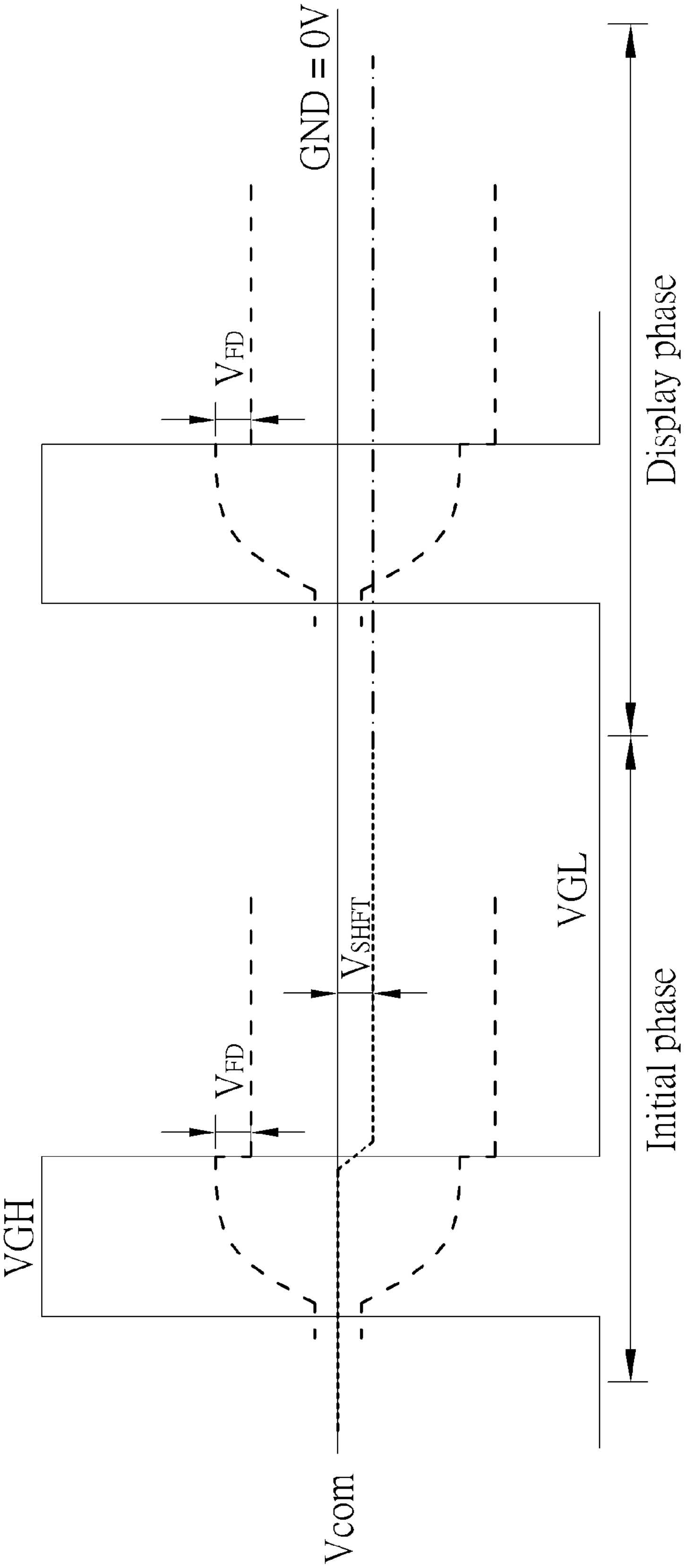
FIG. 2B illustrates a waveform of an exemplary display unit.

Please refer to FIG. 2B, which illustrates a waveform of an exemplary display unit. Precisely, the common voltage $V_{com}$ is set to a predetermined value (e.g. 0v) in the initial phase. When the gate driving circuit 240 turns off the gate lines (i.e. the gate signals drop from the positive level VGH down to the negative level VGL) the switch 290 couples the common voltage terminal $T_{VCOM}$ of the display module 200 to the coupling voltage detection circuit 260. The coupling voltage detection circuit 260 detects the coupling voltage $V_{FD}$ and generates the compensation voltage $V_{SHFT}$. Preferably, the coupling voltage $V_{FD}$ may be stored in a register of the coupling voltage detection circuit 260 (not shown in FIG. 2). In the display phase, the switch 290 couples the common voltage terminal $T_{VCOM}$ to the common voltage circuit 280. The common voltage circuit adjusts the common voltage $V_{com}$ according to the compensation voltage $V_{SHFT}$ and outputs the common voltage $V_{com}$ to the display module 200. For example, the common voltage $V_{com}$ is 0V, initially. When the gate lines are turned off, the coupling voltage detection circuit 260 detects the coupling voltage $V_{FD}$=−0.6V, and generates the compensation voltage $V_{SHFT}$=−1.2V. In the display phase, the common voltage circuit 280 adjusts the common voltage $V_{com}$ from 0V down to −1.2V and outputs the adjusted common voltage $V_{com}$=−1.2V to the display module 200.

Figure 2C:
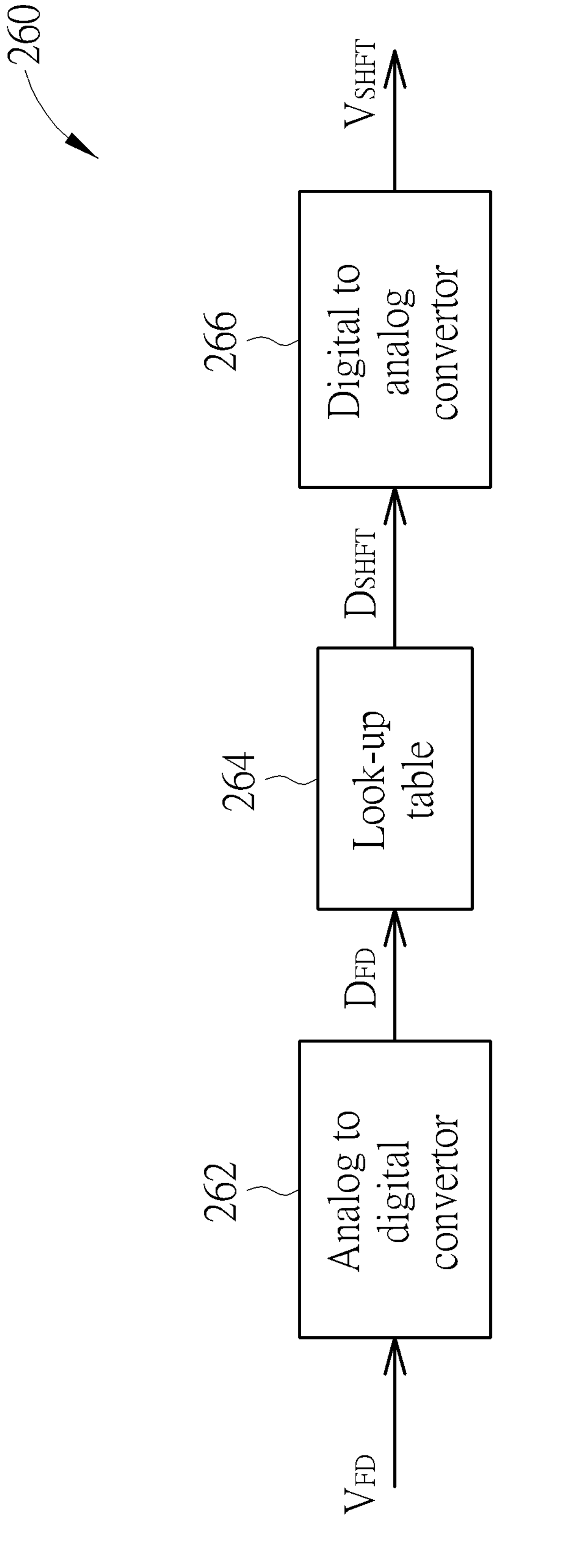
FIG. 2C is an exemplary schematic diagram of the coupling voltage detection circuit in FIG. 2A.

Please refer to FIG. 2C, which is an exemplary schematic diagram of the coupling voltage detection circuit 260, but not limited herein. The coupling voltage detection circuit 260 includes an analog to digital convertor (ADC) 262, a look-up table 264 and a digital to analog convertor (DAC) 266. The ADC 262 is used for receiving the analog coupling voltage $V_{FD}$ and converts it into a digital value $D_{FD}$. The look-up table 264 outputs a digital value $D_{SHFT}$ corresponding to the compensation voltage $V_{SHFT}$. The DAC 266 is used for converting the digital value $D_{SHFT}$ to the analog compensation value $V_{SHFT}$.

Figure 3:
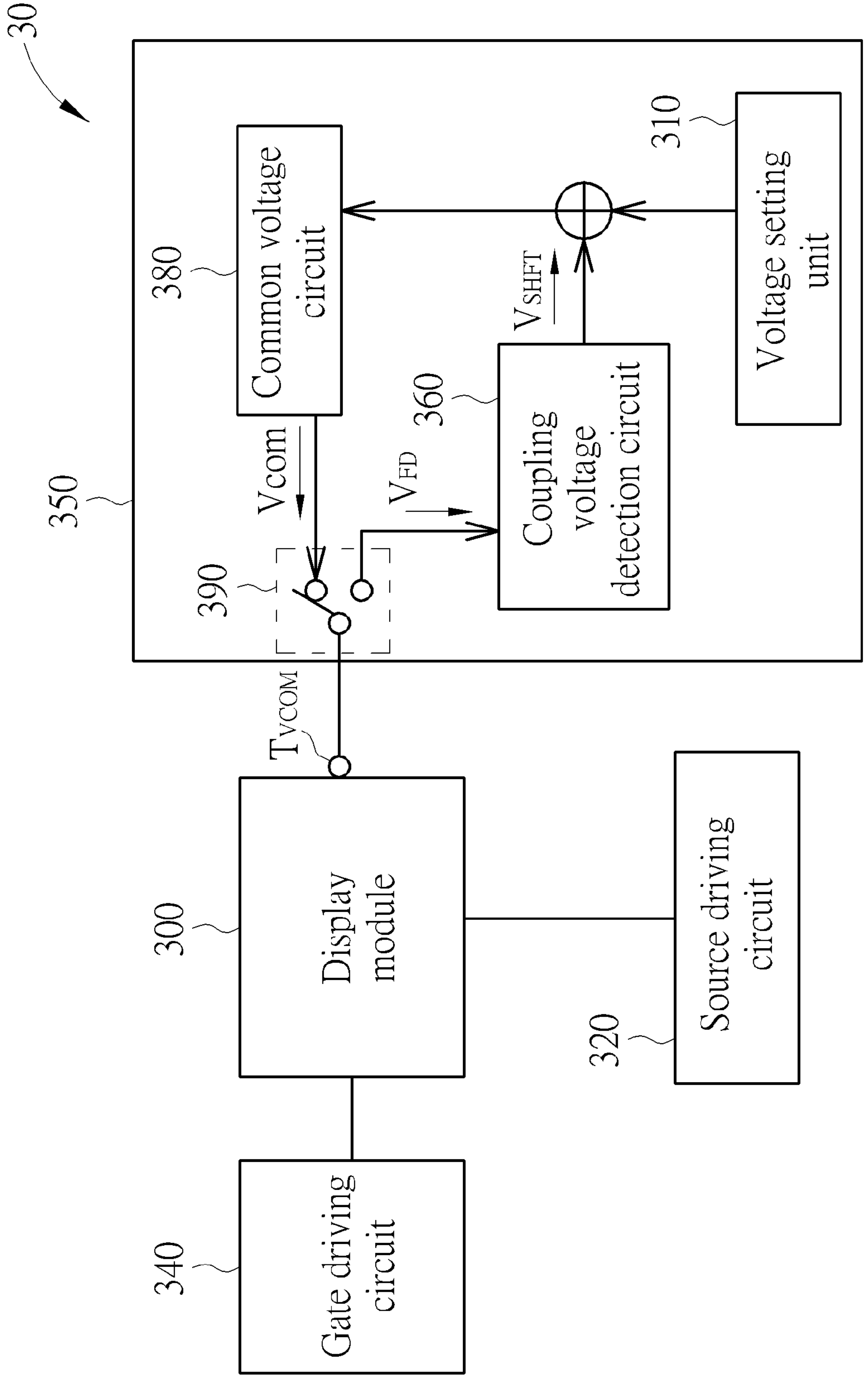
FIG. 3 is a schematic diagram of another LCD.

In some examples, the voltage calibration circuit further includes a voltage setting unit. Please refer to FIG. 3, which is a schematic diagram of an LCD 30. In FIG. 3, the LCD 30 includes a display module 300, a source driving circuit 320, a gate driving 340 and a voltage calibration circuit 350. The voltage calibration circuit 350 includes a coupling voltage detection circuit 360, a common voltage circuit 380, a switch 390 and a voltage setting unit 310. The difference from the example in FIG. 2A is the voltage setting unit 310, which is coupled to the coupling voltage detection circuit 360 and the common voltage circuit 380. The voltage setting unit 310 is used for setting a predetermined shift value of the common voltage $V_{com}$. When the gate driving 340 turns off the gate lines the switch 390 couples the common voltage terminal $T_{VCOM}$ of the display module 300 to the coupling voltage detection circuit 360. The coupling voltage detection circuit 360 detects the coupling voltage $V_{FD}$ and generates the compensation voltage $V_{SHFT}$ by using an equation associated with the coupling voltage $V_{FD}$ or the look-up table. In the display phase, the switch 390 couples the common voltage terminal $T_{VCOM}$ of the display module 300 to the common voltage circuit 380 and the common voltage circuit 380 adjusts the common voltage $V_{com}$ according to the superposition of the compensation voltage $V_{SHFT}$ and the predetermined shift value of the common voltage $V_{com}$ and then outputs the adjusted common voltage $V_{com}$ to the display module 300. For example, the common voltage $V_{com}$ is set to 0V, initially. When the gate lines are turned off, the coupling voltage detection unit 360 detects the coupling voltage $V_{FD}$=−0.6V. The voltage setting unit 310 sets the shift value of the common voltage $V_{com}$ to −1V. Thus, the coupling voltage detection circuit 360 generates the compensation voltage $V_{SHFT}$=−0.2V according to the coupling voltage $V_{FD}$. In the display phase, the common voltage circuit 380 adjusts the common voltage $V_{com}$ (0V) to −1.2V (i.e. −0.2V+−1V) according to the superposition of the compensation voltage $V_{SHFT}$ and the shift value of the common voltage $V_{com}$ and outputs the adjusted common voltage $V_{com}$ to the display module 300.

Figure 4:
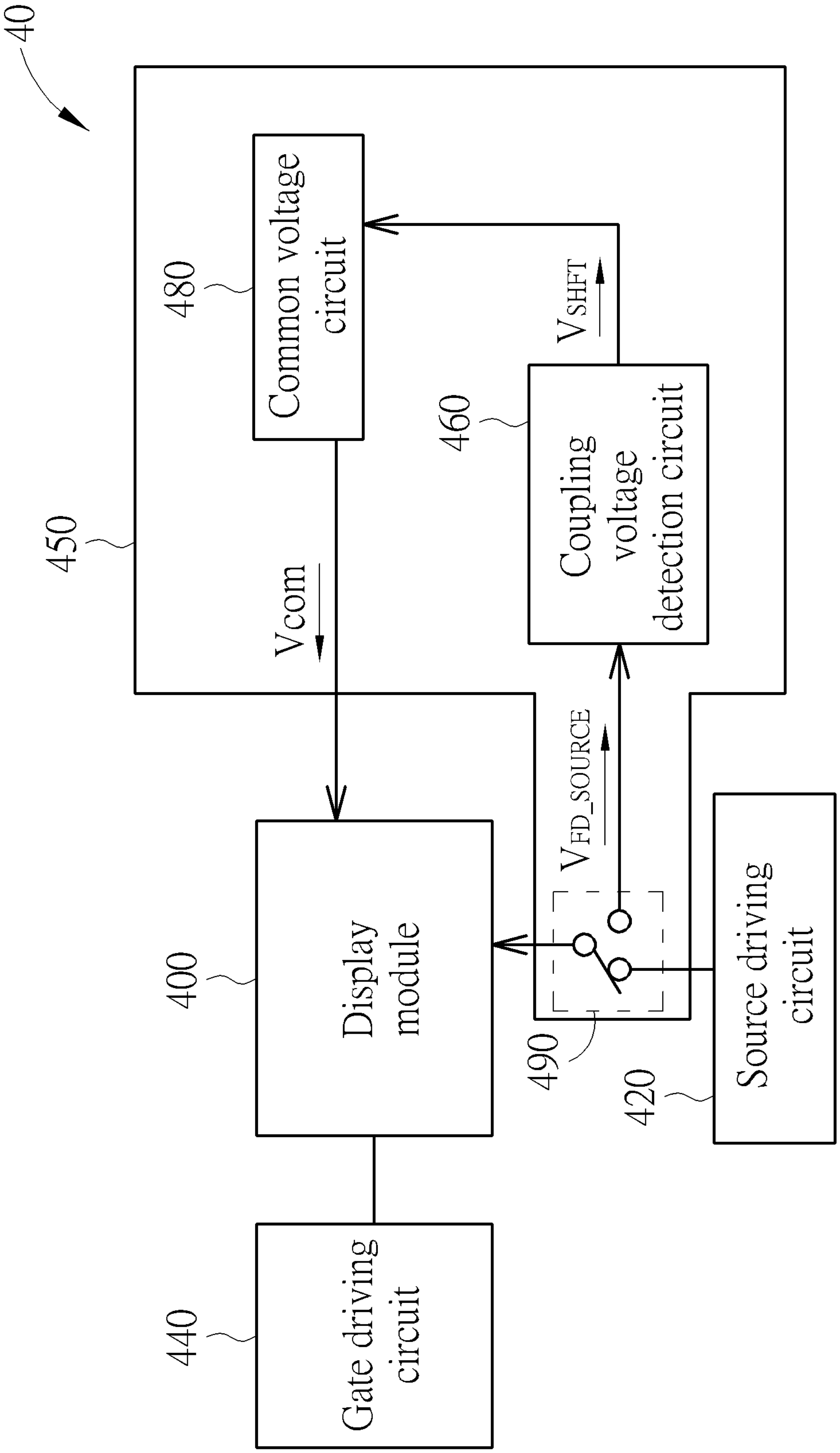
FIG. 4 is a schematic diagram of an exemplary LCD.

In some examples, the coupling voltage detection circuit can be coupled not only to the common voltage terminal $T_{VCOM}$ of the display module, also to the source driving circuit or both of the source driving circuit and the common voltage terminal $T_{VCOM}$ for detecting the couple voltage $V_{FD}$. Please refer to FIG. 4, which is a schematic diagram of an exemplary LCD 40. In FIG. 4, the LCD 40 includes a display module 400, a source driving circuit 420, a gate driving circuit 440 and a voltage calibration circuit 450. The voltage calibration circuit 450 includes a coupling voltage detection circuit 460, a common voltage circuit 480 and a switch 490. The difference between the LCD 40 and the LCD 20 is the elements which the switch 490 is coupled to. The switch 490 is coupled to the display module 400, the source driving circuit 420 and the coupling voltage detection circuit 460 and used for coupling the display module 400 to the source driving circuit 420 or the coupling voltage detection circuit 460. When the gate driving circuit 440 turns off the gate lines, the switch 490 couples the common voltage terminal $T_{VCOM}$ to the coupling voltage detection 460. The coupling voltage detection circuit 460 detects the coupling voltage $V_{FD\_source}$ on the source lines and generates the compensation voltage $V_{SHFT}$ according to the coupling voltage $V_{FD\_source}$. Preferably, the coupling voltage $V_{FD\_source}$ on the source lines is about the same as the coupling voltage $V_{FD}$ on the common voltage terminal $T_{VCOM}$. In the display phase, the switch 490 couples the display module 400 to the source driving circuit 420 and then the common voltage circuit 480 adjusts the common voltage $V_{com}$ according to the compensation voltage $V_{SHFT}$ and outputs the common voltage $V_{com}$ to the display module 400.

Figure 5:
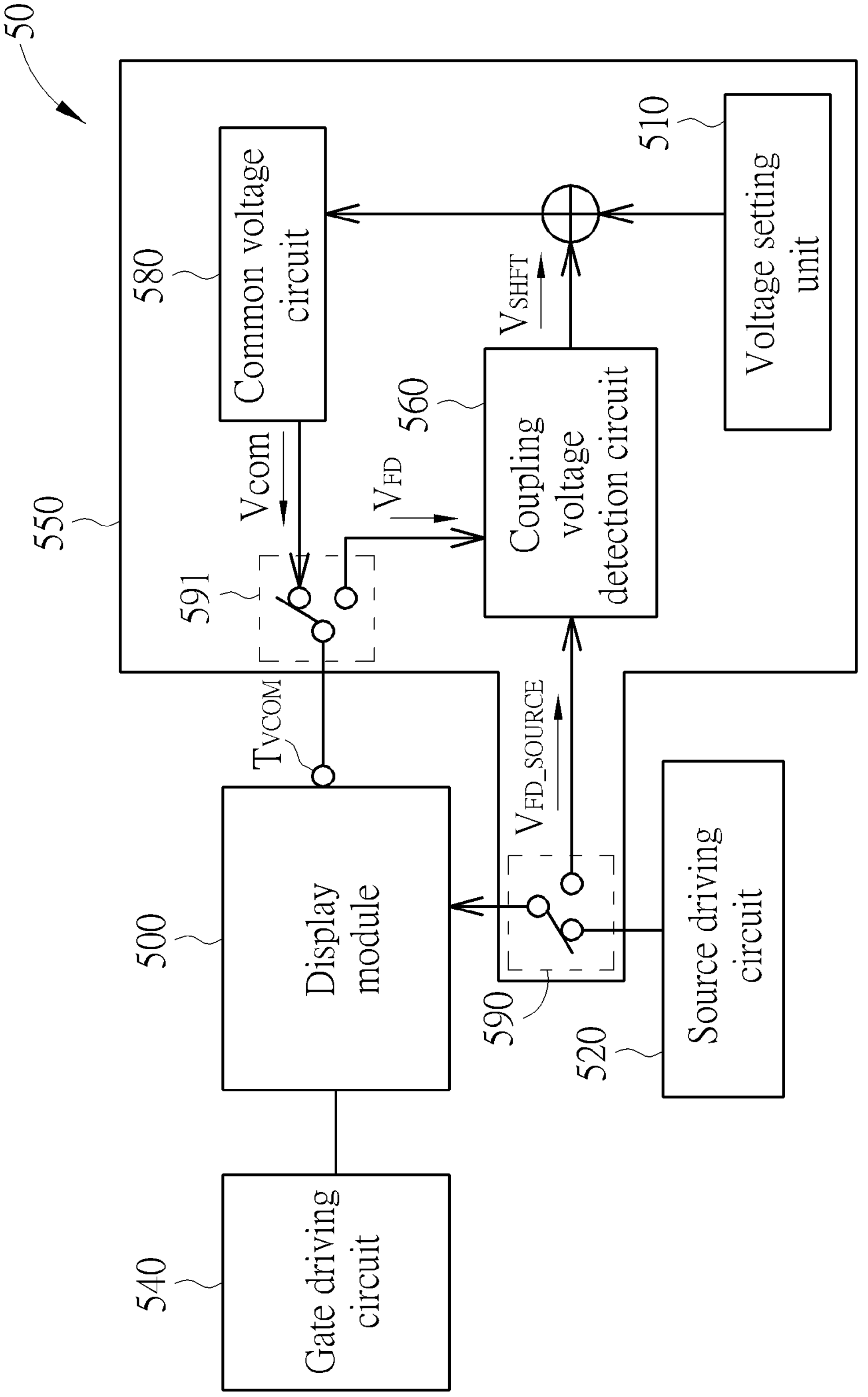
FIG. 5 is a schematic diagram of an exemplary LCD.

Please refer to FIG. 5, which is a schematic diagram of an exemplary LCD 50. The LCD 50 includes a display module 500, a source driving circuit 520, a gate driving circuit 540 and a voltage calibration 550. The voltage calibration circuit 550 includes a coupling voltage detection circuit 560, a common voltage 580, a voltage setting unit 510, a first switch 590 and a second switch 591. The voltage calibration circuit 550 is a combination of the voltage calibration circuit 350 and the voltage calibration circuit 450, and thus the voltage calibration circuit 550 has the similar structure. The difference is that the voltage calibration circuit 550 further includes the second switch 591. The first switch 590 is coupled to the display module 500, the source driving circuit 520 and the coupling voltage detection circuit 560 and used for coupling the display module 500 to the source driving circuit 520 or the coupling voltage detection circuit 560. The second switch 591 is coupled to the display module 500, the common voltage circuit 580 and the coupling voltage detection circuit 560, and used for coupling the display module 500 to the common voltage terminal $T_{VCOM}$ or the coupling voltage detection circuit 560. That is, the coupling voltage detection circuit 560 detects the coupling voltage $V_{FD\_source}$ on the scan lines as well as the coupling voltage $V_{FD}$ on the common voltage terminal $T_{VCOM}$ and generates the compensation voltage $V_{SHFT}$ according to the coupling voltage $V_{FD}$ and $V_{FD\_source}$. In the display phase, the first switch 590 couples the display module 500 to the source driving circuit 520 while the switch 591 couples the common voltage terminal $T_{VCOM}$ of the display module 500 to the common voltage circuit 580. The common voltage circuit 580 adjusts the common voltage $V_{com}$ according to the superposition of the shift value of the common voltage $V_{com}$ and the compensation voltage $V_{SHFT}$ and then outputs the common voltage $V_{com}$ to the display module 500.

Figure 6A:
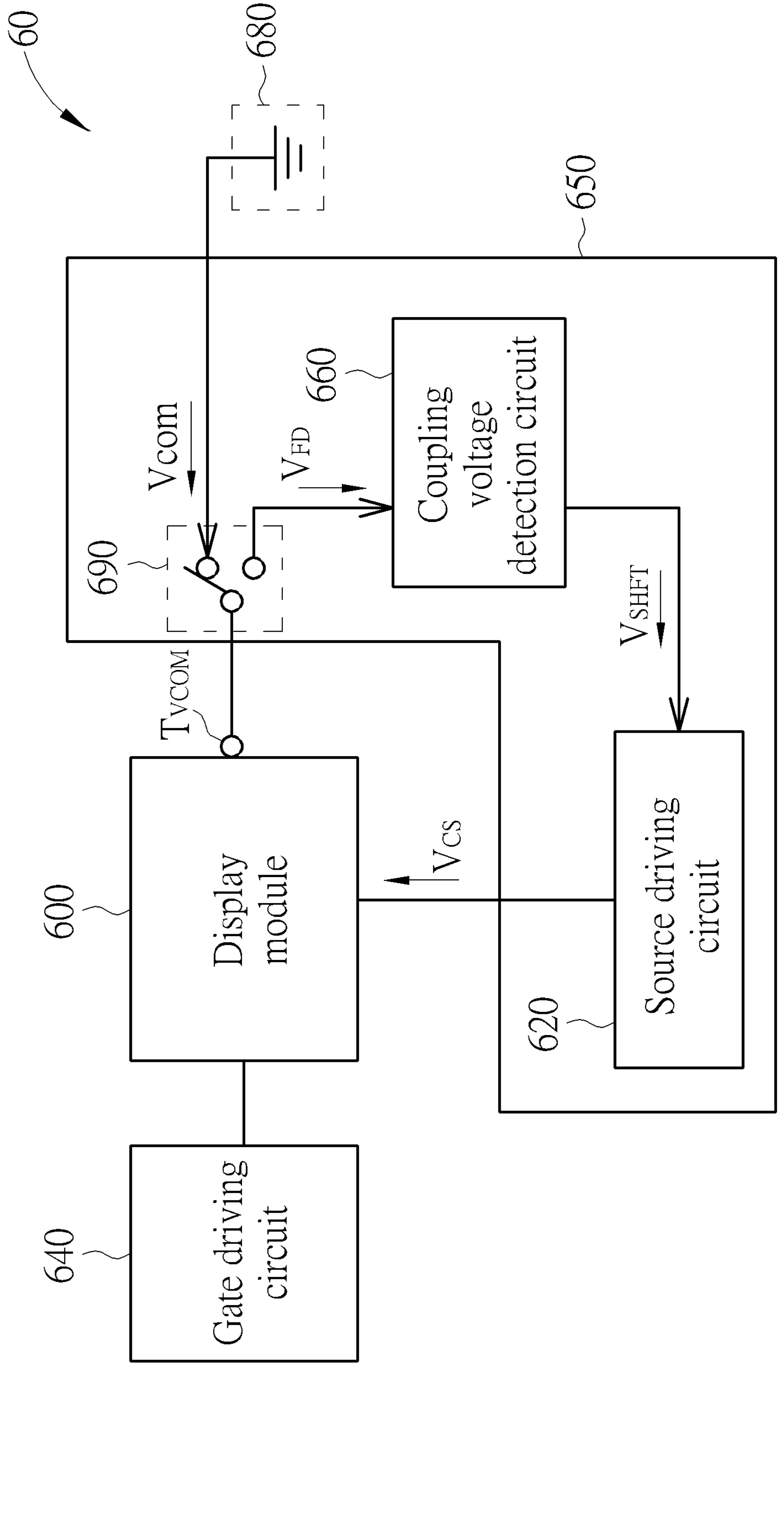
FIG. 6A is a schematic diagram of an exemplary LCD.

Please refer to FIG. 6A, which is a schematic diagram of a LCD 60. The LCD 60 includes a display module 600, a gate driving circuit 640 and a voltage calibration circuit 650. The voltage calibration circuit 650 includes a source driving circuit 620, a coupling voltage detection circuit 660 and a switch 690. The basic structure of the LCD 60 is similar to the LCD 10 in FIG. 1, and thus the same description is omitted herein. The gate driving circuit 640 is used for generating multiple gate signals to turn on/off the gate lines. The parasitic capacitance of the display module 600 generates a coupling voltage $V_{FD}$ on the falling edge of the gate signals (i.e. the gate lines are turned off). The switch 690 is coupled to the coupling voltage detection circuit 660 and used for coupling the display module 600 to a ground terminal 680 or the coupling voltage detection circuit 660. When a common voltage terminal $T_{VCOM}$ is coupled to the ground terminal 680, the common voltage $V_{com}$ has a fixed value, 0V. The coupling voltage detection circuit 660 is used for detecting the coupling voltage $V_{FD}$ and generates a compensation voltage $V_{SHFT}$ according to the coupling voltage $V_{FD}$ in an initial phase. The initial phase is a time period after the LCD 60 is turned on but before the images are displayed. The source driving circuit 620 is used for outputting an unadjusted display voltage Vcs' to the display module 600 in the initial phase and outputs an adjusted display voltage Vcs to the display module 600 according to the compensation voltage $V_{SHFT}$ in a display phase. Therefore, the LCD 60 of the present disclosure can detect the coupling voltage generated by the parasitic capacitances in the initial phase and actively adjust the display voltage to avoid the flickering without a writing process. Further, the manufacture time can be reduced and the total throughout can be increased.

Figure 6B:
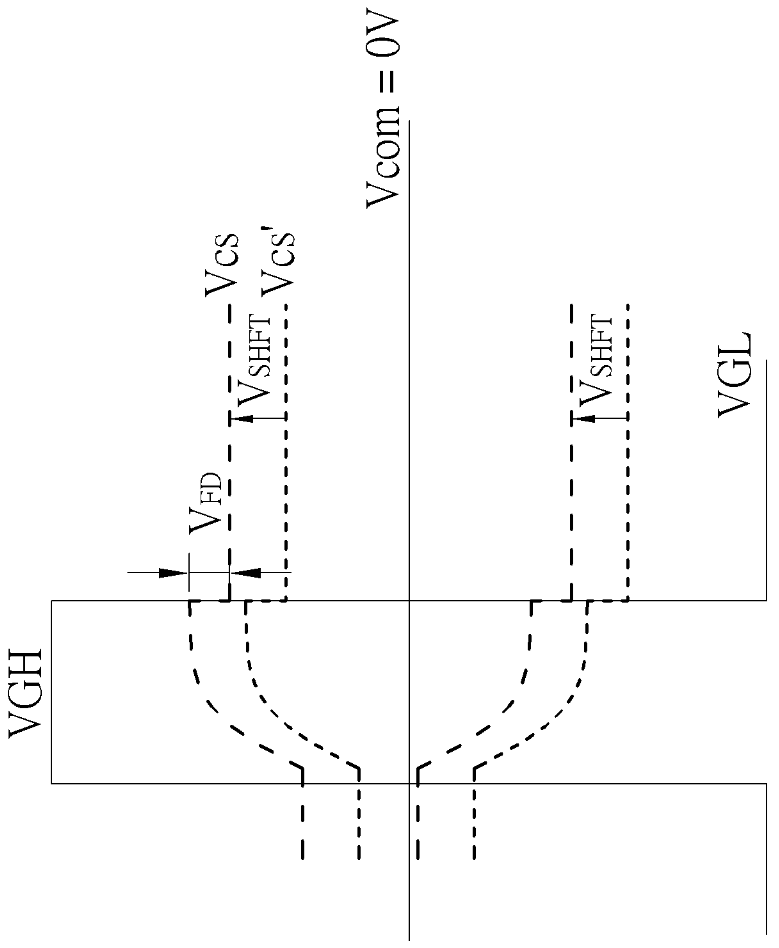
FIG. 6B is a waveform of an exemplary display unit.

Please refer to FIG. 6B, which is a waveform of an exemplary display unit. In the initial phase, the common voltage $V_{com}$ is set to a predetermined value (e.g. 0v) in advance. The source driving circuit 620 outputs the unadjusted display voltage Vcs' to the equivalent capacitors of the display module 600. When the gate driving circuit 640 turns off the gate lines (i.e. gate signals go from the positive level VGH to the negative level VGL) the switch 690 couples the common voltage terminal $T_{VCOM}$ to the coupling voltage detection circuit 660. The coupling voltage circuit 660 detects the coupling voltage $V_{FD}$ and generates the compensation voltage $V_{SHFT}$. Preferably, the coupling voltage $V_{FD}$ may be stored in a register of the coupling voltage detection circuit 660 (not shown in FIG. 6A). In the display phase, the switch 690 couples the common voltage terminal $T_{VCOM}$ to the ground terminal 680, such that the common voltage terminal $T_{VCOM}$ is set to 0V. The coupling voltage detection circuit 600 outputs the compensation voltage $V_{SHFT}$ to the source driving circuit 620. The source driving circuit 620 outputs the display voltage Vcs to the display module 600 according to the compensation voltage $V_{SHFT}$.

Figure 7:
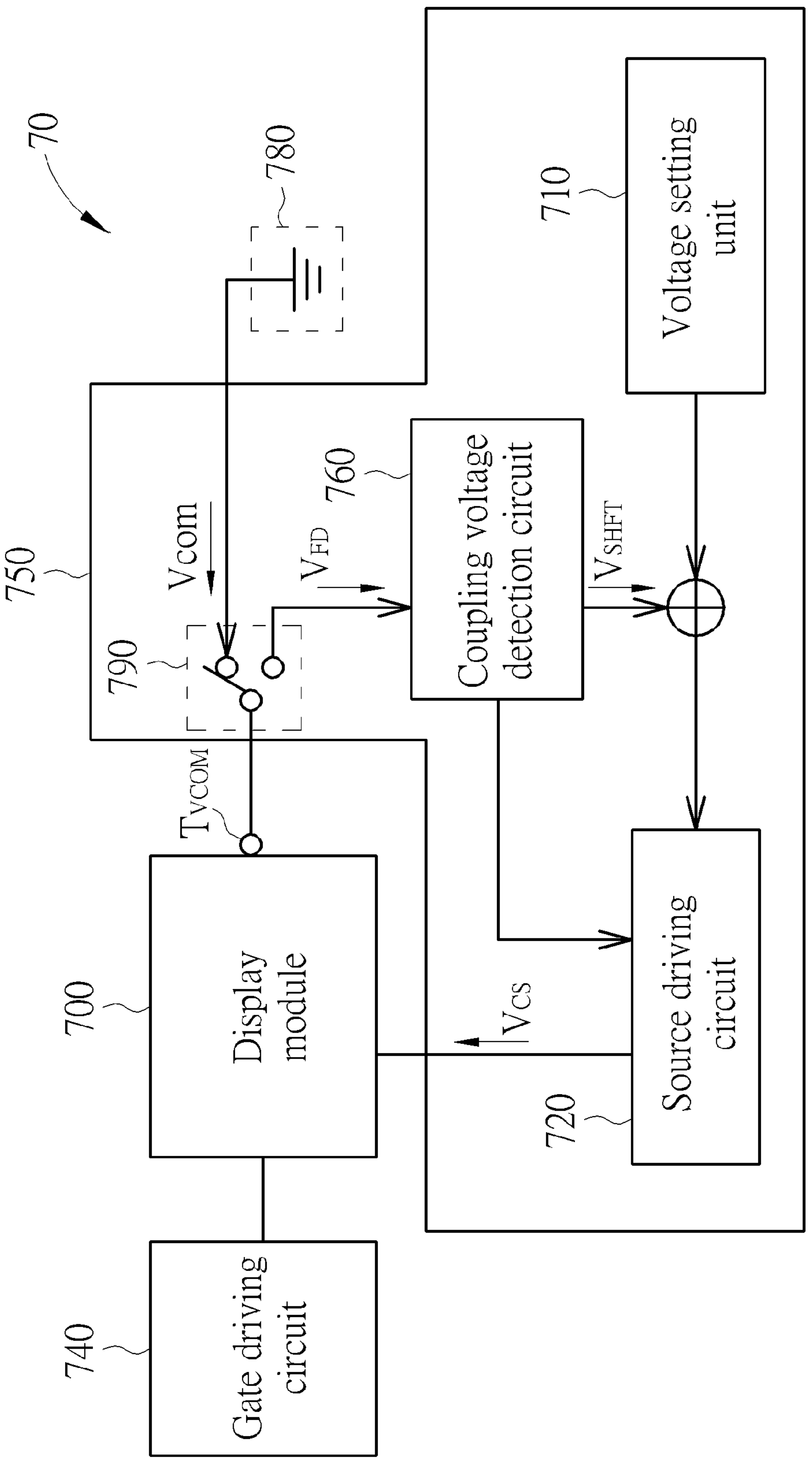
FIG. 7 is a schematic diagram of an exemplary LCD.

In some examples, the voltage calibration circuit may further include a voltage setting unit. Please refer to FIG. 7, which is a schematic diagram of an exemplary LCD 70. In FIG. 7, the LCD 70 includes a display module 700, a gate driving circuit 740 and a voltage calibration circuit 750. The voltage calibration 750 includes a source driving circuit 720, a coupling voltage detection 760, a switch 790 and a voltage setting unit 710. The basic structure of the LCD 70 is similar to the LCD 60. The difference is that the voltage setting 710 is coupled to the coupling voltage detection circuit 760 and the source driving circuit 720. The voltage setting 710 is used for setting a predetermined shift value of the display voltage. When the gate driving circuit 760 turns off the gate lines, the switch 790 couples the common voltage terminal $T_{VCOM}$ of the display module 700 to the coupling voltage detection circuit 760. The coupling voltage detection circuit 760 detects the coupling voltage $V_{FD}$ and generates the compensation voltage $V_{SHFT}$ according to the coupling voltage $V_{FD}$. In the display phase, the switch 790 couples the common voltage terminal $T_{VCOM}$ of the display module 700 to the ground terminal 780. The source driving 720 adjusts the display voltage Vcs' according to the superposition of the compensation voltage $V_{SHFT}$ and the predetermined shift value of the display voltage, and outputs the adjusted display voltage Vcs to the display module 700 in the display phase.

Figure 8:
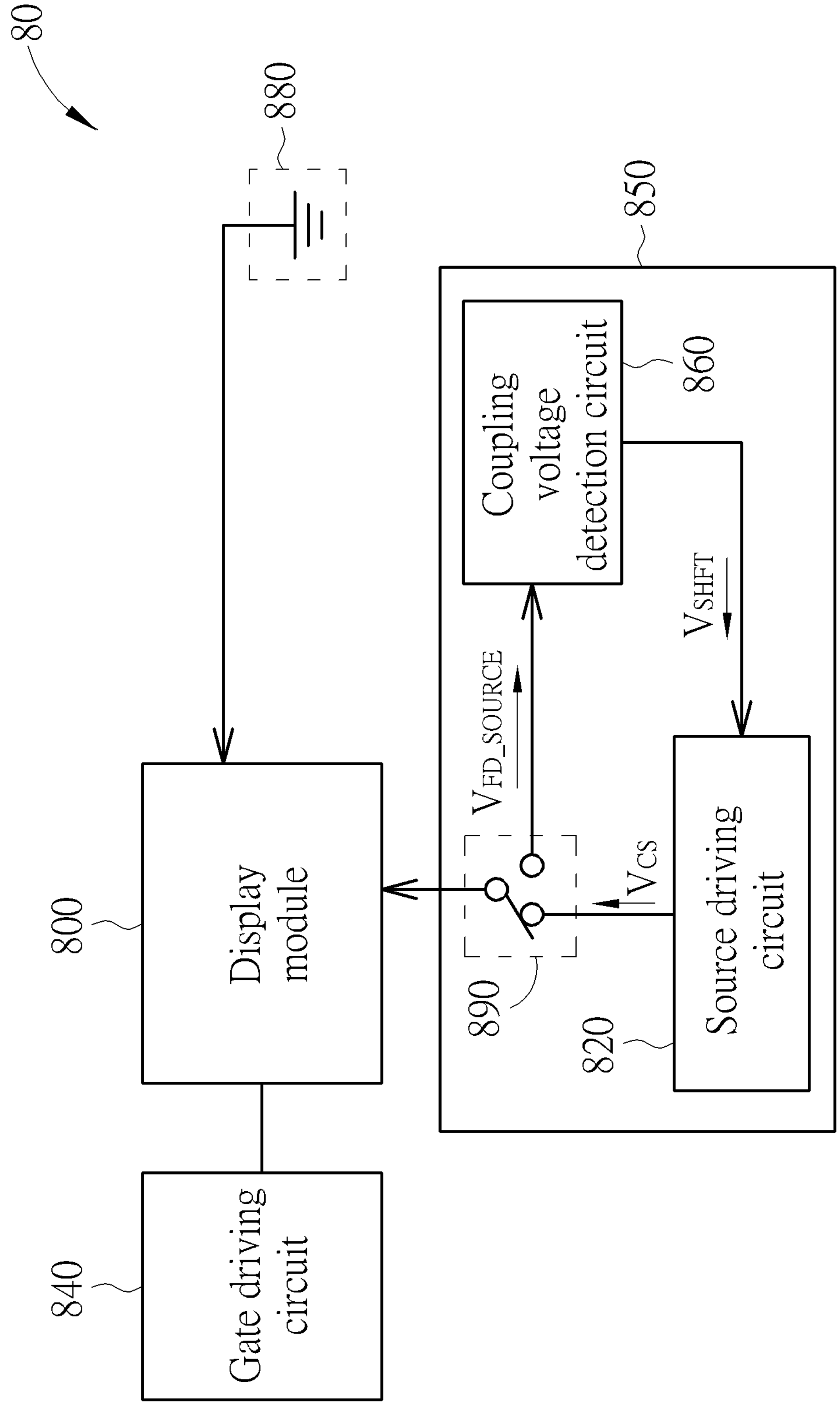
FIG. 8 is a schematic diagram of an exemplary LCD.

In some examples, the coupling voltage detection circuit is coupled to not only the display module (e.g. 600 or 700), also the source driving circuit or both of the source driving circuit and the common voltage terminal to detect the coupling voltage $V_{FD}$ on the scan lines. Please refer to FIG. 8, which is a schematic diagram of an exemplary LCD 80. In FIG. 8, the LCD 80 includes a display module 800, a gate driving circuit 840 and a voltage calibration circuit 850. The voltage calibration circuit 850 includes a source driving circuit 820, a coupling voltage detection circuit 860 and a switch 890. The difference of the LCD 80 is that the elements the switch 890 is couple to are different than the switch 690 and the display module 800 is coupled to the ground terminal 880 directly. The switch 890 is coupled to the display module 800, the source driving circuit 820 and the coupling voltage detection circuit 860 for coupling the display module 800 to the source driving circuit 820 or the coupling voltage detection circuit 860. When the gate driving circuit 840 turns off the gate lines, the switch 890 couples the display module 800 to the coupling voltage detection circuit 860. Then, the coupling voltage detection circuit 860 detects the coupling voltage $V_{FD\_source}$ on the scan lines and generates the compensation voltage VSHFT according to the coupling voltage $V_{FD\_source}$ on the scan lines. Preferably, the coupling voltage $V_{FD\_source}$ on the scan lines is about the same as the coupling voltage $V_{FD}$ on the common voltage terminal $T_{VCOM}$. In the display phase, the switch 890 couples the display module 800 to the source driving circuit 820. The source driving circuit 820 adjusts the display voltage Vcs' according to the compensation voltage $V_{SHFT}$ and outputs the adjusted display value Vcs to the display module 800.

Figure 9:
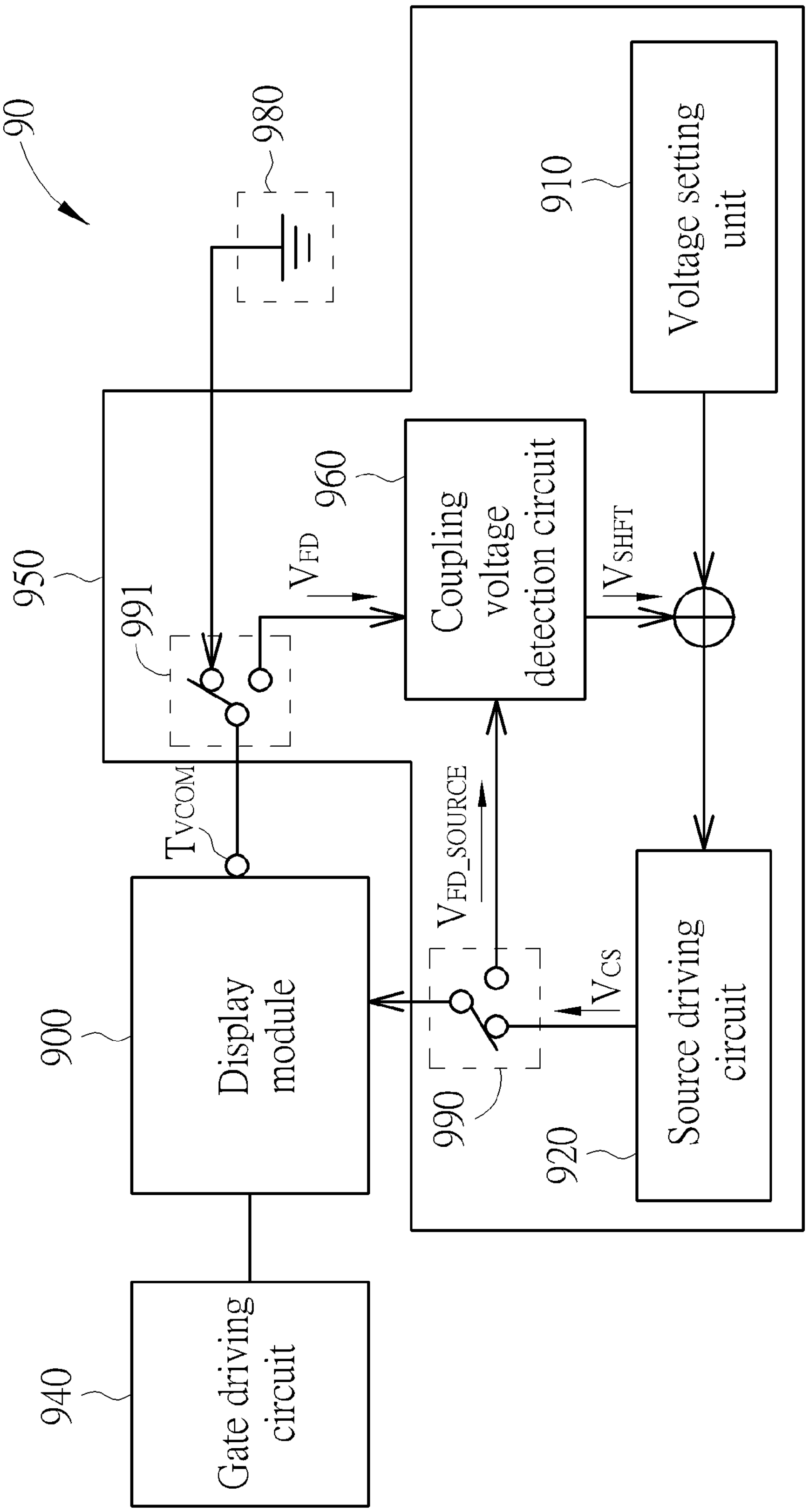
FIG. 9 is a schematic diagram of an exemplary LCD.

Please refer to FIG. 9, which is a schematic diagram of an exemplary LCD 90. The LCD 90 includes a display module 900, a gate driving circuit 940 and a voltage calibration circuit 950. The voltage calibration circuit 950 includes a source driving circuit 920, a coupling voltage detection circuit 960, a ground terminal 980, a voltage setting unit 910, a first switch 990 and a second switch 991. The LCD 90 is a combination of the LCD 70 and the LCD 80, and thus has a similar structure. The only difference is that the voltage calibration 950 further includes the second switch 991. The first switch 990 is coupled to the display module 900, the source driving circuit 920 and the coupling voltage detection circuit 960 and used for coupling the display module 900 to the source driving circuit 920 or the coupling voltage detection circuit 960. The second switch 991 is coupled to the display module 900, the ground terminal 980 and the coupling voltage detection circuit 960 and used for coupling the common voltage terminal $T_{VCOM}$ of the display module 900 to the ground terminal 980 or the coupling voltage detection circuit 960. When the gate driving circuit 940 turns off the gate lines, the first switch 990 couples the display module 900 to the coupling voltage detection circuit 960 and the second switch 991 couples the common voltage terminal $T_{VCOM}$ of the display module 900 to the coupling voltage detection circuit 960. That is, the coupling voltage detection circuit 960 detects the coupling voltage $V_{FD\_source}$ on the scan lines as well as the coupling voltage $V_{FD}$ on the common voltage terminal $T_{VCOM}$ of the display module 900 and generates the compensation voltage $V_{SHFT}$ according to the coupling voltage $V_{FD\_source}$ and the coupling voltage $V_{FD}$. In the display phase, the first switch 990 couples the display module 900 to the source driving circuit 920 and the second switch 991 couples the common voltage terminal $T_{VCOM}$ of the display module 900 to the ground terminal 980 such that the common voltage $V_{com}$ is set to 0V. The source driving circuit 920 adjusts the display voltage Vcs' according to the superposition of the shift value of the display voltage and the compensation voltage $V_{SHFT}$ and outputs the adjusted display voltage Vcs to the display module 900.

To sum up, the coupling voltage detection circuit of the present disclosure can actively detect the coupling voltage generated by the parasitic capacitance (e.g. the coupling voltage on the scan lines or the common voltage terminal) in the initial phase and adjust the common voltage according to the coupling voltage, in order to avoid the flickering caused by the voltage difference. Compared to the prior art, the present disclosure does not require the writing process, and thus can reduce the manufacture time and increase the total throughout.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage calibration circuit for a display module, the display module comprising a plurality of pixel capacitors and a common voltage terminal, one end of each of the plurality of pixel capacitors electrically and directly connected to the common voltage terminal, the voltage calibration circuit comprising:

a coupling voltage detection circuit for detecting a coupling voltage in an initial phase and generating a compensation voltage according to the coupling voltage;

a common voltage circuit for adjusting a common voltage according to the compensation voltage and outputting the common voltage to the display module in a display phase; and a switch, having one terminal connected to the common voltage terminal of the display module, and another terminal connected to the coupling voltage detection circuit or the common voltage circuit, such that the switch is configured to couple the display module to the coupling voltage detection circuit or the common voltage circuit;

wherein the initial phase is a time period after the display module is turned on but before any image has been displayed;

wherein the coupling voltage in the initial phase is a voltage difference on the common voltage terminal before and after an initial falling edge of gate signals of the display module.

2. The voltage calibration circuit of claim 1, wherein the switch couples the display module to the coupling voltage detection circuit in the initial phase.

3. The voltage calibration circuit of claim 1, wherein the switch couples the display module to the common voltage circuit in the display phase.

4. The voltage calibration circuit of claim 1 further comprising a switch coupled to a source driving circuit and the coupling voltage detection circuit, for coupling the display module to the source driving circuit or the coupling voltage detection circuit.

5. The voltage calibration circuit of claim 1 further comprising:

a first switch coupled to a source driving circuit and the coupling voltage detection circuit, for coupling the display module to the source driving circuit or the coupling voltage detection circuit.

6. The voltage calibration circuit of claim 1 further comprising a voltage setting unit coupled to the coupling voltage detection circuit and the common voltage circuit for setting a predetermined shift value for the common voltage.

7. A liquid crystal device (LCD) comprising:

a display module comprising a plurality of parasitic capacitances, a plurality of pixel capacitors and a common voltage terminal, wherein one end of each of the plurality of pixel capacitors is electrically and directly connected to the common voltage terminal;

a gate driving circuit for generating a plurality of gate signals;

a source driving circuit coupled to the display module for outputting a display voltage to the display module; and a voltage calibration circuit comprising:

a coupling voltage detection circuit for detecting a coupling voltage in an initial phase and generating a compensation voltage according to the coupling voltage;

a common voltage circuit for adjusting a common voltage according to the compensation voltage and outputting the common voltage to the display module in a display phase; and a switch, having one terminal connected to the common voltage terminal of the display module, and another terminal connected to the coupling voltage detection circuit or the common voltage circuit, such that the switch is configured to couple the display module to the coupling voltage detection circuit or the common voltage circuit;

wherein the initial phase is a time period after the display module is turned on but before any image has been displayed;

wherein the coupling voltage in the initial phase is a voltage difference on the common voltage terminal before and after an initial falling edge of gate signals of the display module.

8. A voltage calibration circuit for a display module, the display module comprising a plurality of pixel capacitors and a common voltage terminal, one end of each of the plurality of pixel capacitors electrically and directly connected to the common voltage terminal, the voltage calibration circuit comprising:

a coupling voltage detection circuit for detecting a coupling voltage in an initial phase and generating a compensation voltage according to the coupling voltage;

a source driving voltage circuit for adjusting a display voltage according to the compensation voltage and outputting the display voltage to the display module in a display phase; and a switch, having one terminal connected to the common voltage terminal of the display module, and another terminal connected to the coupling voltage detection circuit or a ground terminal, such that the switch is configured to couple the display module to the coupling voltage detection circuit or the ground terminal;

wherein the initial phase is a time period after the display module is turned on but before any image has been displayed;

wherein the coupling voltage in the initial phase is a voltage difference on the common voltage terminal before and after an initial falling edge of gate signals of the display module.

9. The voltage calibration circuit of claim 8 further comprising a switch coupled to the coupling voltage detection circuit, for coupling the display module to a ground terminal or the coupling voltage detection circuit.

10. The voltage calibration circuit of claim 9, wherein the switch couples the display module to the coupling voltage detection circuit in the initial phase.

11. The voltage calibration circuit of claim 9, wherein the switch couples the display module to the ground terminal in the display phase.

12. The voltage calibration circuit of claim 8 further comprising a switch coupled to the source driving circuit and the coupling voltage detection circuit, for coupling the display module to the source driving circuit or the coupling voltage detection circuit.

13. The voltage calibration circuit of claim 8 further comprising:

a first switch coupled to the source driving circuit and the coupling voltage detection circuit, for coupling the display module to the source driving circuit or the coupling voltage detection circuit.

14. The voltage calibration circuit of claim 8 further comprising a voltage setting unit coupled to the coupling voltage detection circuit and the source driving circuit for setting a predetermined shift value for the display voltage.

15. A liquid crystal device (LCD) comprising:

a display module comprising a plurality of parasitic capacitances, a plurality of pixel capacitors and a common voltage terminal, wherein one end of each of the plurality of pixel capacitors is electrically and directly connected to the common voltage terminal;

a gate driving circuit for generating a plurality of gate signals; and a voltage calibration circuit comprising:

a coupling voltage detection circuit for detecting a coupling voltage in an initial phase and generating a compensation voltage according to the coupling voltage;

a source driving circuit for adjusting a display voltage according to the compensation voltage and outputting the display voltage to the display module in a display phase; and a switch, having one terminal connected to the common voltage terminal of the display module, and another terminal connected to the coupling voltage detection circuit or a ground terminal, such that the switch is configured to couple the display module to the coupling voltage detection circuit or the ground terminal;

wherein the initial phase is a time period after the display module is turned on but before any image has been displayed;

wherein the coupling voltage in the initial phase is a voltage difference on the common voltage terminal before and after an initial falling edge of gate signals of the display module.

* * * * *